US005089282A

United States Patent [19]

Wellman

[11] Patent Number: 5,089,282

[45] Date of Patent: Feb. 18, 1992

[54] WHEAT MILLING PROCESS

[75] Inventor: Warner Wellman, Omaha, Nebr.

[73] Assignee: ConAgra Inc., Omaha, Nebr.

[21] Appl. No.: 557,631

[22] Filed: Jul. 24, 1990

[51] Int. Cl.[5] ..... A23P 1/00

[52] U.S. Cl. ..... 426/483; 426/507; 426/622

[58] Field of Search ..... 426/481, 483, 622, 518; 241/159, 13; 99/518, 528, 607, 617

[56] References Cited

U.S. PATENT DOCUMENTS

| | | | |
|---|---|---|---|
| 421,575 | 2/1890 | Johnson | 426/483 |
| 503,889 | 8/1893 | Williamson | 99/617 |
| 677,587 | 7/1901 | Nagel | 426/482 |
| 721,649 | 2/1903 | Pendleton | 99/617 |
| 2,379,677 | 7/1945 | Borsakovsky | 426/483 |
| 2,392,365 | 1/1946 | Carter | 241/159 |
| 2,651,470 | 9/1953 | Dodds et al. | 99/617 |
| 2,867,256 | 1/1959 | Earle | 426/482 |
| 3,667,523 | 6/1972 | Lynn et al. | 426/481 |
| 3,703,200 | 11/1972 | Palyi | 426/483 |
| 3,945,312 | 3/1976 | Borisov et al. | 99/605 |
| 3,960,068 | 6/1976 | Salete | 99/607 |
| 3,979,375 | 9/1976 | Rao et al. | 426/483 |
| 4,052,518 | 10/1977 | Borisov et al. | 426/483 |
| 4,292,890 | 10/1981 | Salete-Garces | 99/607 |
| 4,324,175 | 4/1982 | Satake | 99/528 |
| 4,421,772 | 12/1983 | Munck | 426/231 |
| 4,426,921 | 1/1984 | Meinardus | 99/617 |
| 4,505,196 | 3/1985 | Beisel | 99/519 |
| 4,583,455 | 4/1986 | Salete-Garces | 99/607 |
| 4,741,913 | 5/1988 | Satake | 426/483 |

FOREIGN PATENT DOCUMENTS

| | | |
|---|---|---|
| 218012 | 4/1987 | European Pat. Off. . |
| 295774 | 12/1988 | European Pat. Off. . |
| 373274 | 6/1990 | European Pat. Off. . |
| 2803527 | 10/1977 | Fed. Rep. of Germany . |
| 778710 | 3/1935 | France . |
| 640750 | 1/1984 | Switzerland . |

OTHER PUBLICATIONS

REMO, Rice Whitener Machine VERTIJET VJ III—Instructions Manual.

REMO Mexico, VERTIJET VJIII, Grain Sheller and Polisher Brochure.

Detection and Localization of Phenolic Compounds in Cereal Grains Using Computerized Microspectrophotometry Fulcher et al.

Determination of Ferulic Acid in Grain by HPLC and Microspectrofluorometry—Wetzel et al., G. Charalambous, Frontiers of Flavor, Proceedings of the 5th International Flavor Conference, Porto Karras, Chalkidiki, Greece, 1-3 Jul. 1987, 1988 Elsevier Science Publishers B.V. Amsterdam, Printed in The Netherlands, pp. 409-429.

Fluorescence Detection and Measurement of Ferulic Acid in Wheat Milling Fractions by Microscopy and HPLC—Pussayanawin et al. J. Agric. Food Chem. 1988, 36, 515-520, 1988 American Chemical Society.

The Botanical Constituents of Wheat and Wheat Milling Fractions by Autofluorescence—Jensen et al., American Association of Cereal Chemists, vol. 59, No. 6, 1982, pp. 477-484.

(List continued on next page.)

*Primary Examiner*—George Yeung
*Attorney, Agent, or Firm*—Willian Brinks Olds Hofer Gilson & Lione

[57] ABSTRACT

Milling quality wheat is milled by first removing germ and outer bran layers amounting to approximately 8-10% of the weight of the wheat in a pearling process. The pearled wheat is then milled in a conventional roller mill to produce flour or semolina. Unexpectedly high yields have been observed, and the process yields a milled product which is unusually high in aleurone cell wall fragments for a given ash content.

34 Claims, 14 Drawing Sheets

OTHER PUBLICATIONS

Inside Cereals—A Fluorescence Microchemical View—Fulcher et al. Ottawa Research Station Agriculture Canada, Ottawa, Ontario Canada.

A Technique to Improve Functionality of Flour from Sprouted Wheat Liu et al. (Including Abstract), Cereal Foods World, Jul. 1986, vol. 31, No. 7, pp. 471–476.

The Influence of Wheat Endospern on Flour Color Grade—Barnes, Journal of Cereal Scient 4 (1986) 143–154.

Differentiation of Wheat Based on Fluorescence, Hardness and Protein—Irving et al., Cereal Chemistry, vol. 66, No. 6, 1989, pp. 471–476.

Analysis of Botanical Components in Cereals and Cereal Products A New Way of Understanding Cereal Processing—Munch et al., Carlsberg Research Laboratory, Copenhagen, pp. 27–40.

Article "Debranning Process is New Approach to Wheat Milling" *World Grain,* Jul./Aug. 1990, pp. 28–32.

Translation of article from Getreide Mehl und Brot, Jun. 1983, pp. 185–189, "Investigations on the Behavior of the Microflora of Duram Wheat During Scouring", by G. Spicher and H. Zwingelberg.

Isolation of Gluten and Starch from Ground, Pearled Wheat Compared to Flour, Q. Zhuge et al., Department of Grain Science and Industry Shellenberger Hall, Kansas State University, Manhattan, Kansas (Abstract).

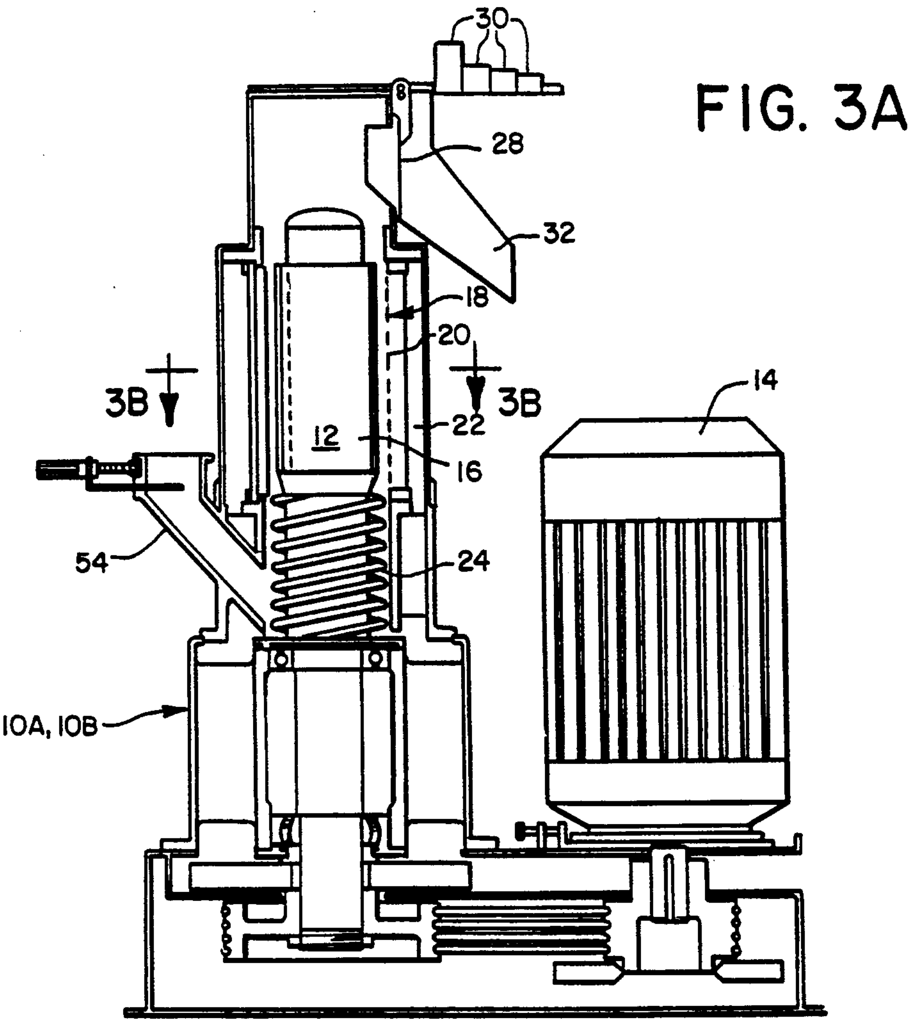
FIG. 3A
FIG. 3B
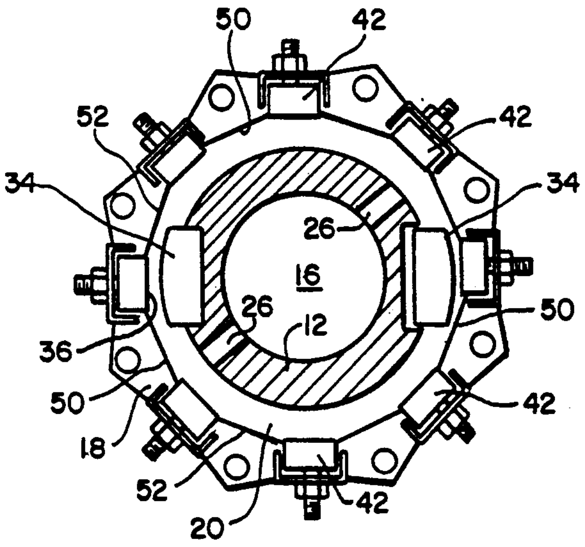

FIG.5F

P2B

| | | | | |
|---|---|---|---|---|
| 800 | 850 | 900 | 950 | 3 BK CH R |
| 750 | 800 | 850 | 900 | 3 BK CH R |

1 SIZ CR R

1 SIZ FN R — 1 SIZ CR R

P3A

FROM - 1 BK, 2 BK, 3BK (+60W)

| | | | | |
|---|---|---|---|---|
| 560 | 600 | 630 | 630 | 4 BK CH R |
| 475 | 500 | 530 | 560 | P4A |

P15A

P15B — P4A

P3B

FROM - 1 BK, 2BK, 3BK (+60W)

| | | | | |
|---|---|---|---|---|
| 560 | 600 | 600 | 630 | 4 BK CH R |
| 475 | 500 | 530 | 630 | P4A |

P15A

P15B — P4A

P8B

FROM - 4 BK (+10xx)

| | | | | |
|---|---|---|---|---|
| 425 | 425 | 450 | 475 | SHRTS DSTR -v- 2 TAIL |
| | | | | 1 TAIL |

6 SIZ — 5 SIZ R -v- 6 SIZ R

FN SEMO -v- P11B, 12A-B — FN SEMO -v- P11B, 12A-B

9A

FROM - 1 BK (+48W)

| | | | | |
|---|---|---|---|---|
| 630 | 630 | 670 | 710 | 3 BK CH R |
| 600 | 600 | 630 | 670 | P4B |

P4B

CR SEMO — CR SEMO

P9B

FROM - 2 BK (+48W)

| | | | | |
|---|---|---|---|---|
| 630 | 630 | 670 | 710 | 3 BK FN R |
| 600 | 600 | 600 | 630 | P4B |

P4B

CR SEMO — CR SEMO

P14B

FROM - 1 SIZ CR, 2 SIZ CR, 2 SIZ FN (+60W)

| | | | | |
|---|---|---|---|---|
| 500 | 500 | 530 | 530 | 3 BK SIFTER |
| 450 | 450 | 475 | 475 | 3 SIZ R |

3 SIZ R

CR SEMO — CR SEMO

P15A

FROM - P3A-B

| | | | | |
|---|---|---|---|---|
| 475 | 500 | 500 | 600 | 2 SIZ CR R |
| 475 | 500 | 500 | 530 | 2 SIZ CR R |

1 SIZ FN R

CR SEMO

P15B

FROM - P3A-B

| | | | | |
|---|---|---|---|---|
| 450 | 500 | 500 | 530 | 2 SIZ FN R |
| 425 | 450 | 475 | 500 | 1 SIZ FN R |

CR SEMO

1 SIZ FN R

P20B

FROM - P7B, P8A

| | | | | |
|---|---|---|---|---|
| 450 | 475 | 500 | 530 | 5 BK SIFTER |
| 425 | 450 | 475 | 500 | 6 SIZ R |

CR SEMO

P11B, 12A-B — 6 SIZ R

P4A
FROM - P3A-B

| | | | | |
|---|---|---|---|---|
| 530 | 560 | 560 | 600 | GERM SIZ R |
| 475 | 475 | 475 | 560 | 1 SIZ FN R |

P4B
FROM - P9A-B, 10A-B

| | | | | |
|---|---|---|---|---|
| 630 | 630 | 710 | 750 | 2 SIZ CR -v- |
| 600 | 630 | 630 | 670 | 2 SIZ FN R<br>2 SIZ FN R |

P5A
FROM - 3 SIZ, 4 SIZ (+60W)

| | | | | |
|---|---|---|---|---|
| 530 | 530 | 560 | 600 | GERM SIZ R |
| 500 | 530 | 530 | 560 | 5 SIZ R |

P10A
FROM - 2 BK (+48W)

| | | | | |
|---|---|---|---|---|
| 560 | 600 | 630 | 630 | 3 BK FN R |
| 530 | 600 | 630 | 630 | 3 SIZ R |

P10B
FROM - 2 BK (+48W)

| | | | | |
|---|---|---|---|---|
| 600 | 600 | 600 | 760 | 3 BK CR R |
| 530 | 600 | 600 | 630 | 3 SIZ R |

P11A
FROM - BK RDST (+8∞)

| | | | | |
|---|---|---|---|---|
| 375 | 375 | 400 | 425 | 1 TAIL |
| 335 | 355 | 400 | 425 | 7 SIZ R |

P16A
FROM - 1 SIZ CR, 1 SIZ FN,
2 SIZ CR (+72W)

| | | | | |
|---|---|---|---|---|
| 355 | 425 | 450 | 450 | 7 SIZ R |
| 355 | 375 | 425 | 450 | 3 SIZ R |

P16B
FROM - 2 SIZ FN, 3 SIZ, 4 SIZ (+72W)

| | | | | |
|---|---|---|---|---|
| 400 | 425 | 450 | 475 | 7 SIZ R |
| 400 | 400 | 400 | 425 | P18A |

P17A
FROM - 1 SIZ FN (+48W)

| | | | | |
|---|---|---|---|---|
| 450 | 600 | 630 | 630 | 2 SIZ CR R |
| 560 | 560 | 600 | 630 | 2 SIZ FN R |

WHEAT MILLING PROCESS

BACKGROUND OF THE INVENTION

This invention relates to an improved wheat milling process for converting wheat into a finely divided milled product such as flour and/or semolina, and to the improved milled wheat product produced thereby.

Conventionally, wheat is milled in roller mills which simultaneously (1) remove outer bran layers and germ from the wheat kernel or berry and (2) reduce the size of the starchy endosperm. A typical roller mill will include a sequence of counter-rotating opposed rollers which progressively break the wheat into smaller and smaller sizes. The output from each pair of rollers is sorted into multiple streams, typically by means of sifters and purifiers, to separate the bran and germ from the endosperm, and to direct coarser and finer fractions of the endosperm to appropriate rollers. *Principles of Cereal Science and Technology,* R. Carl Hoseney (The American Association of Cereal Chemists, Inc., 1986), describes the operation of a conventional roller mill at pages 139–143.

Such conventional roller mills reduce the size of the bran and germ simultaneously as they reduce the size of the endosperm. For this reason, the bran, germ and endosperm fragments are intimately mixed together, and portions of the endosperm inevitably remain with the bran and germ when the bran and germ are removed. This of course reduces milling efficiency and increases the cost of the final milled product.

Bran is also conventionally removed from cereal grains such as rice, barley and wheat by means of pearling machines. For example, Salete U.S. Pat. No. 3,960,068 and Salete-Garces U.S. Pat. Nos. 4,292,890 and 4,583,455 describe grain polishing and whitening machines which are indicated as being particularly suitable for polishing and whitening rice. These devices process dehusked rice to remove outer bran layers from the rice without breaking the endosperm by forcing the rice upwardly in an annular column between two sets of opposed abrasive elements. The inner set of abrasive elements rotates with respect to the outer, and rice in the region of the abrasive elements is fluidized by a radially outwardly directed air flow. Bran and removed flour from the rice pass radially outwardly and are thereby separated from the polished endosperm. Though pearling or polishing machines such as those described above are commonly used in processing rice and other cereal grains such as barley, they are not used in conjunction with roller milling operations of sound, milling quality wheat, to the best of applicant's knowledge.

Pearling has been used to improve the flour obtained from germinated wheat. See "A Technique to Improve Functionality of Flour from Sprouted Wheat," R. Liu, et al., Cereal Foods World, Vol. 31, No. 7, pp. 471–476 (July, 1986). This article describes a process for pearling germinated wheat or a blend of germinated and sound wheat in a Strong Scott Laboratory Barley Pearler before the pearled wheat is milled in a roller mill to produce flour. Pearling was used to remove damaged tissue resulting from germination, thereby improving flour quality. As discussed at page 474, pearling removed the germ from about one half of the germinated kernels but from only 3% of the sound kernels in a blend of germinated and sound wheat.

Wheat flour and semolina are milled in very large quantities, and any improvement in milling efficiency or in quality of the milled product will result in major cost savings.

SUMMARY OF THE INVENTION

It is a primary object of this invention to provide an improved wheat milling process which provides an increased yield as compared with conventional roller milling processes (i.e., a greater percentage of the incoming wheat is milled to a finely divided product at a given ash content).

It is another object of this invention to provide an improved wheat milling process which reduces operating and capital costs per unit of production as compared with prior art roller milling processes.

It is another object of this invention to provide an improved wheat milling process that provides a higher throughput of milled product of a given ash and/or color content for a mill of a given capital cost, as compared with prior art roller milling processes.

It is another object of this invention to provide a improved milled wheat product which retains more of the aleurone layer than prior milled wheat products for a given ash and/or color content.

According to the process of this invention, a quantity of milling quality wheat having an endosperm and a germ surrounded by a plurality of bran layers is milled. At least 5% of the initial weight of the wheat is removed from the wheat without substantially reducing the average size of the endosperm by passing the wheat between two sets of abrasive elements while flowing a gas through the wheat and moving the two sets of abrasive elements with respect to one another, thereby forming a reduced bran pearled wheat. The average size of the pearled wheat is then progressively reduced by passing it through a sequence of multiple roller mills to form a finely divided final product at a plurality of roller mills in the sequence. Additional portions of the remaining bran layers are removed during this size reducing step.

By removing a sufficient portion of the outer bran layers in the initial bran removing step, the finely divided milled wheat product will (1) constitute at least about 75 weight percent of the initial quantity of wheat, and (2) will have an ash content for durum of no more than about 1.0 weight percent. Those skilled in the art will recognize that this represents an unusually high yield.

Another aspect of this invention is that the milling process described above can be used with durum wheat to insure that the finely divided final product (1) constitutes at least 65 weight percent of the initial quantity of wheat and (2) has an ash content of no more than about 0.75 weight percent. Those skilled in the art will recognize that this represents an unusually high yield.

The process of this invention can be used to produce an improved finely divided food grade durum wheat product having an ash content no greater than about 1.0 weight percent, a measured aleurone fluorescence area of at least 4.0 percent, and an average particle size no greater than that of semolina. Those skilled in the art will recognize that this food grade wheat product exhibits a surprising combination of a relatively low ash content and a relatively high measured aleurone fluorescence area. This is because the outer bran layers have been removed while leaving an unusually large fraction of the aleurone layer with the endosperm. The milling process and product of this invention provide significant advantages. In particular, the milling process described below provides a substantially higher yield for a given ash content of the final product. This is believed to be at least in part because (1) a larger fraction of the aleurone layer of the endosperm remains with the endosperm and is not removed with the outer bran layers and (2) the removed bran carries with it less flour. The milling process described below also reduces the energy costs per unit output as well as the capital costs per unit output. All of these advantages are achieved without reducing the quality of the resulting milled wheat product. As pointed out below, food tests show that wheat flour made with the process described below is equal or superior to wheat flour milled in the conventional manner, and bacteria counts have been found to be lower.

The invention itself, together with further objects and attendant advantages, will best be understood by reference to the following detailed description, taken in conjunction with the accompanying drawings.

BRIEF DESCRIPTION OF THE DRAWINGS

FIG. 3A is a partial sectional view of one of the bran removal machines of FIG. 2, in which the orientation of the outlet chute has been changed for clarity of illustration.

FIG. 3B is a cross-sectional view taken along line 3B—3B of FIG. 3A.

FIGS. 5A through 5H define the roller mills, sifters, purifiers and product flows used in the size reduction and further bran removal step of FIG. 1.

DETAILED DESCRIPTION OF THE PRESENT PREFERRED EMBODIMENTS

Figure 1:
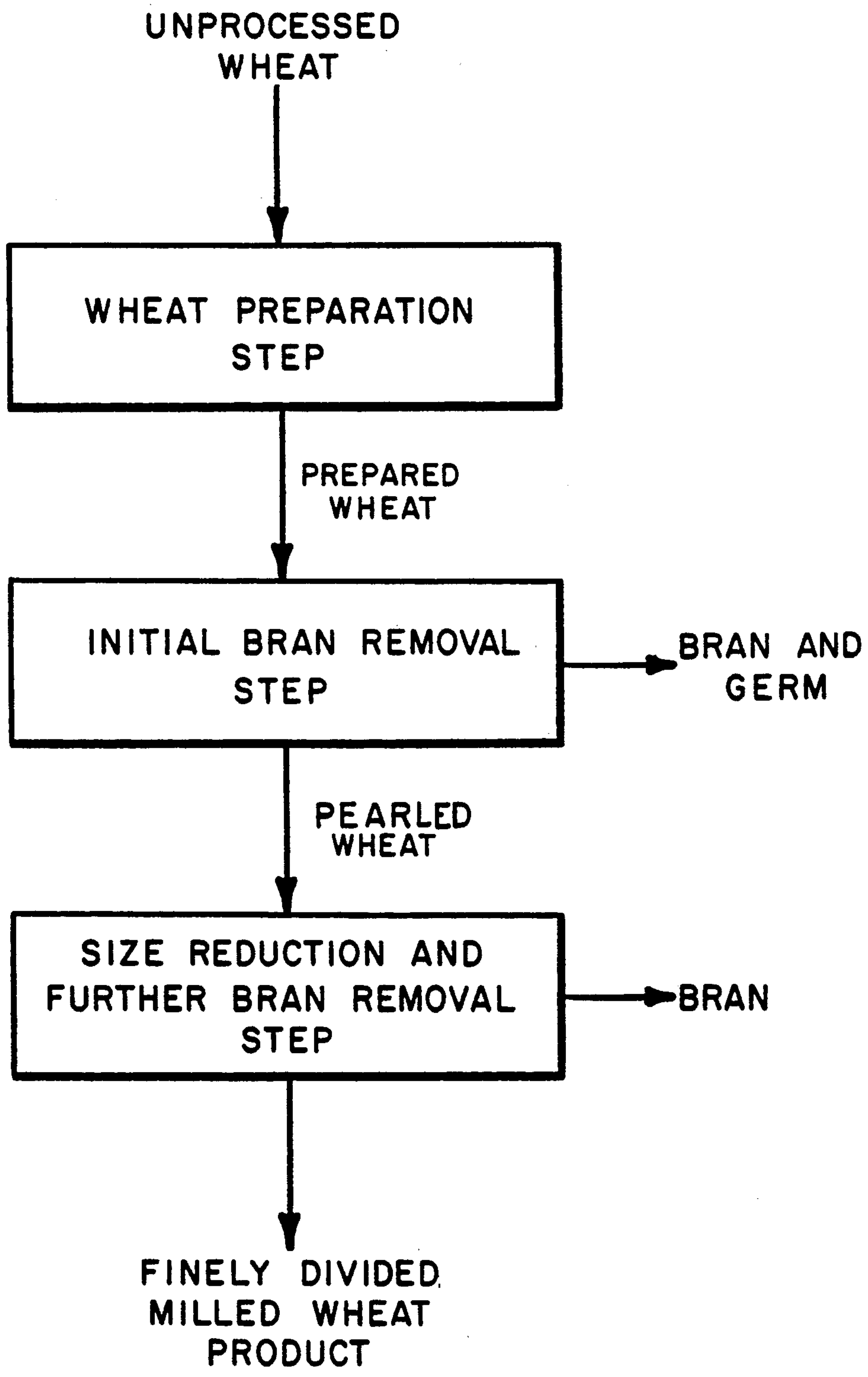
FIG. 1 is a flow chart of a presently preferred embodiment of the milling process of this invention.

The following section defines terms that are used in this specification and the following claims. Subsequent sections describe in detail the presently preferred embodiments of the milling process and product of this invention, and then provide examples.

Definitions

Wheat—The term wheat is intended to include the species and varieties of wheat commonly grown for cereal grain, including durum, red durum, hard red, white and soft red wheat, including both spring wheat and winter wheat. The wheat kernel or berry is commonly defined as having a seed surrounded by a pericarp. The seed in turn includes: a germ, an endosperm and a seed coat. The endosperm includes a starchy endosperm which makes up the large body of the kernel and an aleurone layer which surrounds the starchy endosperm. The seed coat in turn surrounds the aleurone layer. In conventional milling the aleurone layer is removed with the seed coat and the pericarp in what is commonly termed bran. Nevertheless, the aleurone layer is classified from the botanical standpoint as a part of the endosperm. Further details regarding wheat structure can be found in standard reference books, as for example at pages 1-14 of *Principles of Cereal Science and Technology* identified above.

Milling Quality Wheat—A wheat characterized by a small fraction of germinated or otherwise damaged kernels and classified as US #2 or better in the classification scheme of 7 CFR §810 will be referred to as milling quality wheat.

Durum—Durum wheat encompasses all durum wheats, including hard amber durum, amber durum, and durum.

Ash Content—Wheat typically has an ash or mineral content of about 1.5 weight percent, but this ash is not distributed evenly in the grain. In general, the inner endosperm is relatively low in ash while the outer bran layers are relatively high in ash. For this reason, ash content is a convenient assay for the presence of bran in flour, and ash is commonly measured as an assay of flour quality. Generally speaking, this is done by heating a measured weight of milled wheat product in the presence of oxygen and weighing the resulting ash as set forth in AACC Methods No. 08-01 and 08-02.

Patent Stream or Product—A high quality, low ash milled wheat product such as flour or semolina having an ash content less than about 0.75 weight percent will be referred to as the total patent stream or product.

Total Food Grade Stream or Product—The total mill output of food grade, finely divided milled wheat product such as flour or semolina having an ash content less than about 1.0 weight percent will be referred to as the total food grade stream or product.

Measured Aleurone Fluorescence Area—The aleurone layer has distinctive fluorescence properties as compared with other portions of the wheat kernel. These fluorescence properties can be used to determine the amount of aleurone in a sample of finely divided wheat product. This is done by microscopically scanning a sample of wheat product in reflected light, (for example using an NIR sample holder) using illumination at 365 nanometers which excites aleurone cell wall fragments to fluoresce distinctively. The area to be scanned is preferably about 1 centimeter by 1 centimeter and the fluorescence monitoring system is standardized against a stable fluorophore such as uranyl glass. The percentage of the total scanned area which exhibits fluorescence characteristic of aleurone is then determined, preferably using automated scanning techniques. In this way the measured aleurone fluorescence area is determined as a percentage of the total scanned area. Further details are set out below in conjunction with Example 2.

PREFERRED EMBODIMENT

FIG. 1 shows a general overview of the presently preferred milling process of this invention. In broad outline, unprocessed wheat is first prepared for milling in substantially the conventional manner. The prepared wheat is then passed through bran removal machines to remove most of the bran and germ without reducing the size of the endosperm, thereby forming pearled wheat. The pearled wheat is then applied as a feedstock to a roller mill that removes additional bran and reduces the size of the endosperm to form a finely divided milled wheat product such as flour or semolina.

Figure 2:
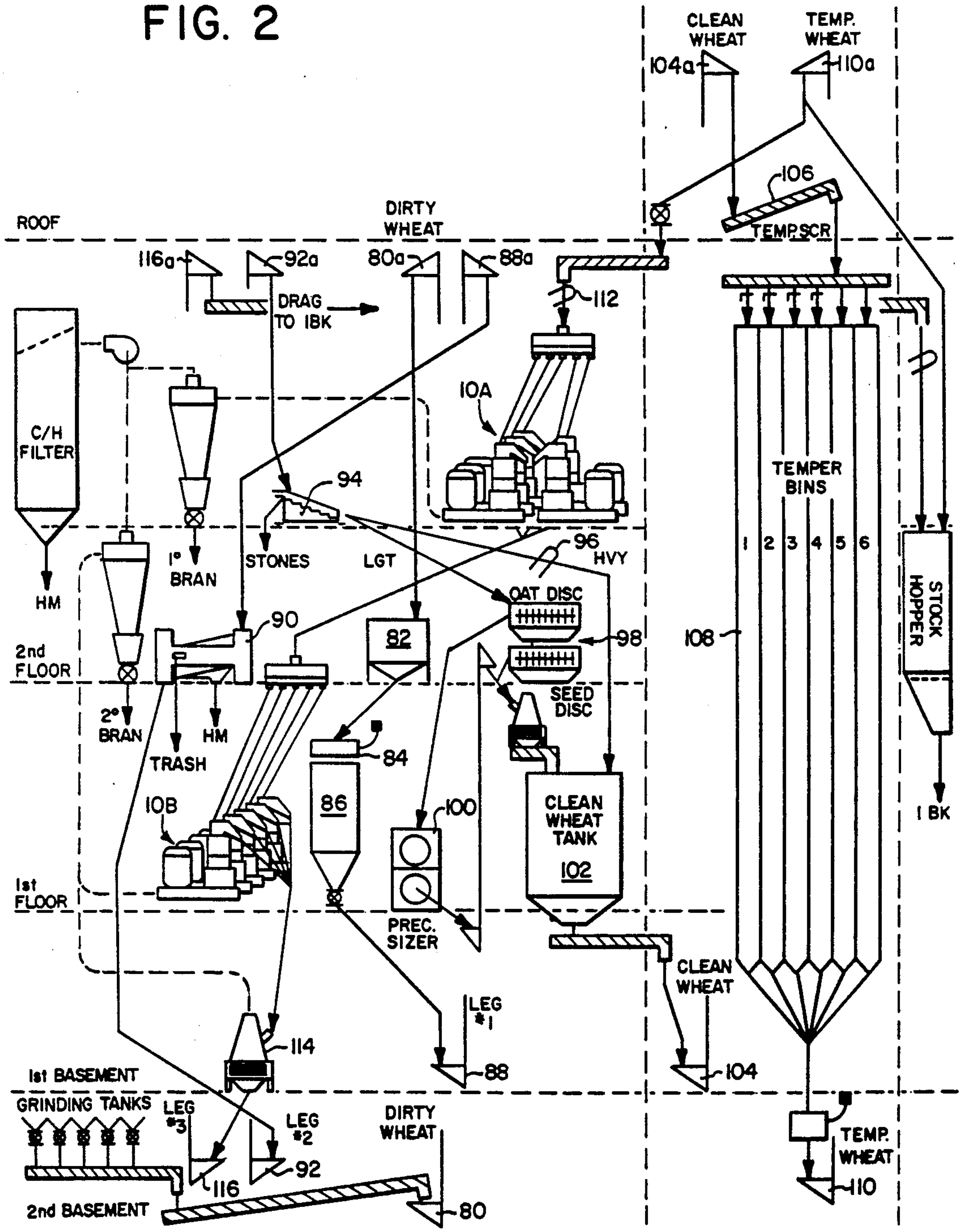
FIG. 2 is a mill flow diagram of the wheat preparation and initial bran removal steps of FIG. 1.

The presently preferred mill flow for the first two steps of FIG. 1 is shown in FIG. 2. In the wheat preparation step, incoming wheat (so called "dirty wheat") is raised by a bucket lift 80, 80*a* into a holding bin 82, from which it passes via a scale 84 and a second holding bin 86 to a second bucket lift 88, 88*a* and a milling separator 90. The separator 90 utilizes reciprocating screens to remove foreign material such as stones and sticks. Wheat which has passed through the separator 90 proceeds via a third bucket lift 92,92*a* to a gravity selector 94 where additional stones are removed, and then to a magnetic separator 96 which removes iron or steel articles. The wheat then passes to a disc separator 98 and a precision sizer 100 which remove barley, oats, cockle and other foreign materials. At this point the wheat has been cleaned of most foreign material, and it is held in a clean wheat tank 102.

From the clean wheat tank 102, wheat is carried by a fourth bucket lift 104, 104*a* to a tumbling conveyor 106, where water is added and the wheat is tempered in tempering bins 108 for about four hours to a moisture level of about 16.4 weight percent.

This initial wheat preparation step of the process is substantially conventional with two exceptions. First, the conventional scouring step is eliminated because this function and other bran removal functions are performed in the initial bran removal step which follows. Second, the initial bran removal step described below heats and drives off moisture from the wheat. For this reason, the wheat is preferably tempered to about 16.4 weight percent moisture, a value approximately 0.6 weight percent greater than usual. This has been found to provide a final product with a standard product moisture level.

After the wheat leaves the wheat preparation step shown in FIG. 1, it then enters an initial bran removal step, in which most of the outer bran layers and the germ are removed from the wheat without substantially reducing the size of the endosperm. Returning to FIG. 2, tempered wheat from the bins 108 is carried by a fifth bucket lift 110, 110*a* past another magnetic separator 112 to a first set of bran removal machines 10A. Partially pearled wheat from the machines 10A passes to a second set of bran removal machines 10B, which produce pearled wheat. This pearled wheat is then passed through a turbo aspirator 114 and then via a sixth bucket lift 116, 116*a* to the first break rolls of the roller mill described below.

As described in detail below, the bran removal machines 10A, 10B are preferably of the general type described in above-referenced U.S. Pat. No. 4,583,455. The wheat is passed upwardly in a fluidized annular stream between two sets of relatively moving abrasive elements. Friction between the wheat and these abrasive elements, between adjacent grains, and between grains of wheat and screens situated between the abrasive elements removes bran from the wheat without substantially reducing the size of the endosperm.

An alternative preferred embodiment of this step eliminates the need for the disc separator 98 and the precision sizer 100 and reduces the required tempering time for the wheat. In this alternative, wheat from the gravity selector 94 is passed to the bran removal machines 10B (with the light wheat fraction going to one of the machines 10B and the heavy wheat fraction going to the remaining four machines 10B). The machines 10B are operated to remove outer bran layers and germ amounting to about 5 wt %. Additionally, the machines 10B perform the separation function previously performed by the separator 98 and sizer 100.

The partially pearled wheat from the machines 10B is lifted to the clean wheat tank 102, from which it is lifted to the tumbling conveyor. After an appropriate amount of water has teen added, the wheat is tempered in the tempering bins for 1–3 hours. Because the outer bran layers have been removed, the tempering time is substantially reduced as compared with the mill flow of FIG. 2. After the wheat is tempered, it is then passed through the bran removal machines 10A to remove a further 2–4 wt % of bran and germ. The resulting fully pearled wheat is then transported via the turbo aspirator 114 and the bucket lift 116, 116*a* to the roller mill of FIGS. 5A–5H.

The initial bran removal step produces a pearled wheat which is then applied as a feed stock to a size reduction and further bran removal step. As described in detail below, this step employs conventional roller mills, sifters and purifiers to reduce the size of the pearled wheat to the desired range as appropriate for flour, semolina or other finely divided milled wheat products.

The resulting finely divided milled wheat product can then be further processed in any suitable manner, for example to enrich the product. The present invention is not concerned with such further processing steps, which may be selected as appropriate for the specific application.

The following sections will provide further details regarding the presently preferred systems for implementing the initial bran removal step and the size reduction and further bran removal step of FIG. 1.

Initial Bran Removal Step

As shown in FIG. 2, during the initial bran removal step the cleaned wheat is passed in sequence through two bran removal machines 10A, 10B. FIG. 3A shows an elevational view of one of the machines 10A, 10B, and FIG. 3B shows a cross-sectional view thereof. Referring to these figures, each of the bran removal machines 10A, 10B includes a central rotor 12 which is mounted for rotation about a vertical axis driven by an electric motor 14. The rotor 12 is hollow and defines a central passageway 16. The upper part of the rotor 12 is surrounded by a basket 18, and an annular treatment chamber 20 is formed between the rotor 12 and the basket 18. The basket 18 is in turn surrounded by a housing to define a bran removal passageway 22 immediately around the basket 18.

The lower end of the rotor 12 defines helical conveyor screws 24 which convey wheat upwardly into the treatment chamber 20 when the rotor 12 is rotated. The upper end of the rotor 12 defines an array of openings 26 interconnecting the central passageway 16 and the treatment chamber 20 (FIG. 3B). The upper portion of the treatment chamber 20 communicates with an outlet gate 28 that is biased to the closed position shown in FIG. 3A by weights 30. Wheat which has been moved upwardly through the treatment chamber 20 lifts the outlet gate 28 and exits the bran removal machine via an outlet chute 32.

Figure 4A:
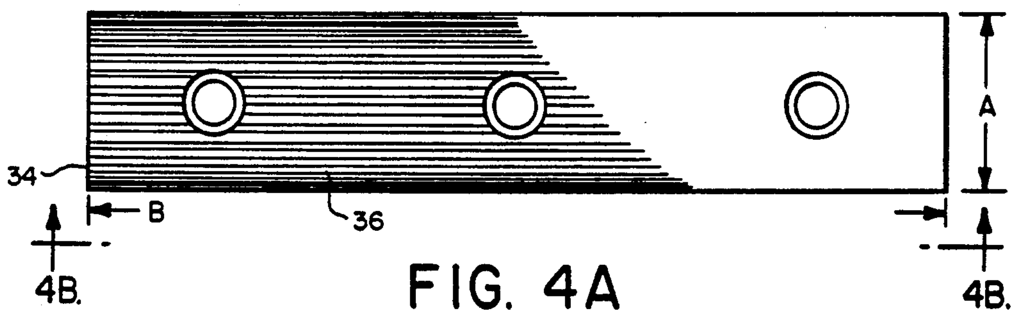
FIGS. 4A through 4J are detailed views of the abrasive elements shown in FIG. 3B.
Figure 4B:
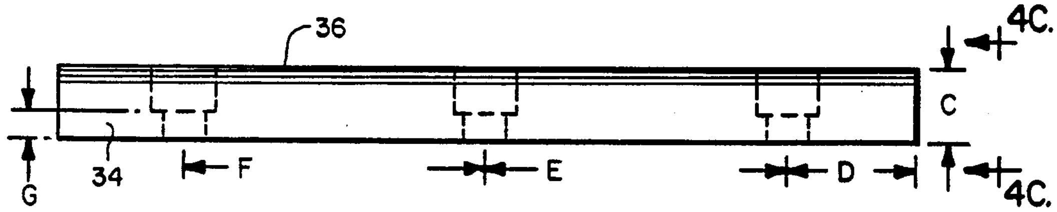
Figure 4C:
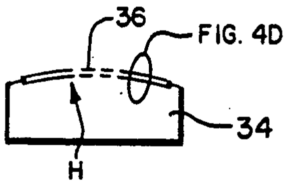
Figure 4D:
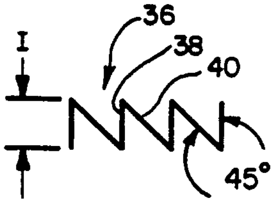
Figure 4E:
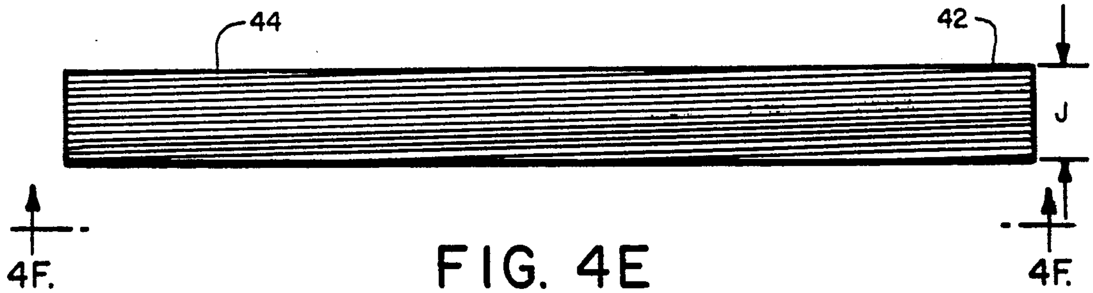
Figure 4F:
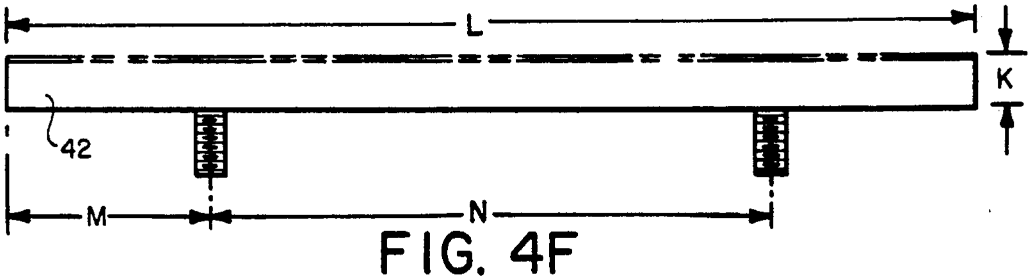
Figure 4G:
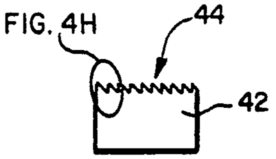

As best shown in FIG. 3B, the upper portion of the rotor 12 supports two radially opposed inner abrasive elements 34. FIGS. 4A–4D provide further details of the inner abrasive elements 34, which define an array of teeth 36 on the outermost portion situated to contact the wheat being treated. Preferably, the teeth 36 are saw-tooth in configuration as shown in FIG. 4D, and each tooth defines a sharp face 38 and a dull face 40, with an included angle of 45°. The crest to crest spacing between adjacent teeth is in this embodiment approximately 1/16 inch. The inner abrasive elements 34 on the rotor 12 are rotated within the basket 18 by the motor 14.

The basket 18 mounts an array of outer abrasive elements 42, which can be formed as shown in FIGS.

Figure 4H:
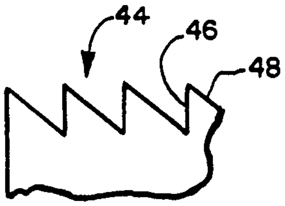
Figure 4I:
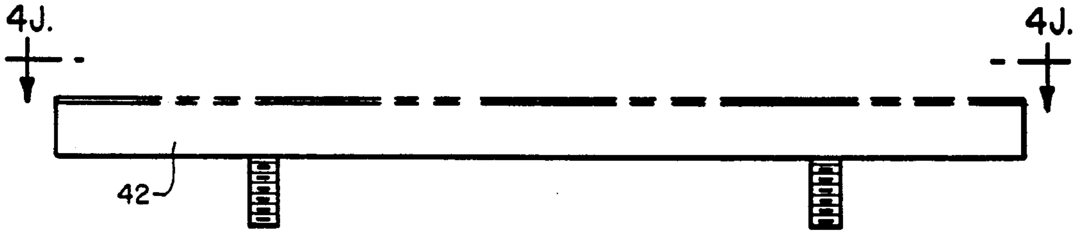
Figure 4J:
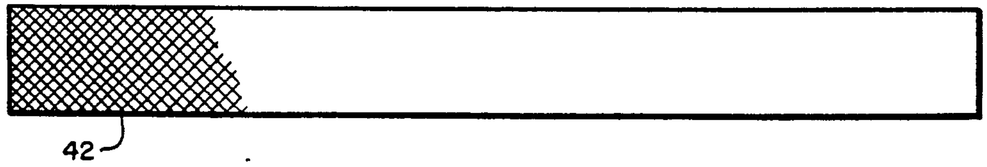

4E-4H or in FIGS. 4I-4J. In either case, the outer abrasive elements 42 define teeth 44 having a sharp face 46 and a dull face 48 as shown in FIG. 4H. The teeth 44 are preferably identical in configuration to the teeth 36 described above. In the embodiment of FIGS. 4E-4H, the teeth 44 are arranged in a helix which advances circumferentially about ¼ of an inch over a length of 12 inches. Alternately, the teeth in the outer abrasive elements 42 can be double cut at 45° as shown in FIGS. 4I and 4J.

Simply by way of example, the abrasive elements 38, 42 can be formed of a steel such as RYCROME 4140 or equivalent, case hardened to a Rockwell hardness of 48 on the C scale in a layer ⅛-3/16 inch thick. A suitable hardening process is to heat the abrasive elements 34, 42 to a temperature of 800°-900° F. and then to quench them in oil at a temperature of 200° F. Table 1 provides presently preferred dimensions for the abrasive elements 34, 42.

TABLE 1

| Preferred Dimensions as Shown in Figures 4A-4H | |
|---|---|
| Reference Symbol | Preferred Dimension (Inches) |
| A | 2⅜ |
| B | 11¾ |
| C | 1 |
| D | 1¾ |
| E | 4⅛ |
| F | 4⅛ |
| G | ⅜ |
| H | 3¼ |
| I | 0.050 |
| J | 1 5/16 |
| K | ¾ |
| L | 13¼ |
| M | 2 13/16 |
| N | 7⅝ |

As shown in FIG. 3B, screens 50 are interposed between the outer abrasive elements 42, and the screens 50 define diagonally situated slots 52. Preferably, the screens 50 are formed of a material such as 20 gauge carbon steel, and the slots 52 are oriented at an angle of 45° and have a size of about 1 millimeter by 12 millimeters.

The bran removal machines 10A, 10B described above operate as follows. Wheat is introduced into the machine 10A, 10B via an input chute inlet 54 into the annular region around the conveyor screws 24. The rotor 12 is rotated by the motor 14 and the conveyor screws 24 advance the wheat upwardly into the treatment chamber 20, where the wheat is abraded between the inner and outer abrasive elements 34, 42 and against the screens 50. Preferably, the elements 34, 42 are oriented such that the sharp faces 38 approach the dull faces 48 as the rotor 12 is rotated. During this process a suction is drawn on the bran removal passageway 22 causing a substantial air flow through the openings 26 and the treatment chamber 20 out the screens 50 into the bran removal passageway 22. This air flow fluidizes the wheat in the treatment chamber 20 and removes bran particles from the flow of wheat.

After treatment, the wheat moves upwardly out of the treatment chamber 20, opens the outlet gate and then falls out the outlet chute 32. As shown in FIG. 2, when two bran removal machines 10A, 10B are used in tandem, the prepared wheat is introduced into the inlet 54 of the first bran removal machine 10A, and the wheat leaving the outlet chute 32 of this first bran removal machine 10A then falls directly into the inlet 54 of the second bran removal machine 10B.

A modified version of the bran removal machine sold by Refaccionari de Molinas, S.A., Mexico City, Mexico under the trade name REMO Vertijet Model VJIII has been found suitable for use in this process. In particular, this bran removal machine has been operated at a rotor speed between 800 and 1800 rpm and preferably about 1300 rpm using a 40 horsepower motor. The minimum separation between the inner and outer abrasive elements 34, 42 is preferably adjusted to 7 mm. The airflow through the bran removal machine is 500-600 SCFM and the weights 30 total 15 pounds. The preferred bran removal machine 10 is a modified version of the Vertijet device described above in that the original equipment screens and the abrasive elements have been replaced with the elements 50, 34, 42 described above. Additionally, a ground strap has been provided between the upper and lower housings to reduce problems associated with static electricity in the area of the outlet chute 32. Further details on the Vertijet bran removal machine can be found in U.S. Pat. No. 4,583,455.

In operation, the weights 30 are selected to cause the machines 10A,10B to remove as much bran and germ as possible without reducing the size of the wheat endosperm. Generally at least 5%, and generally 9-10% of the wheat supplied to the bran removal machines 10A, 10B is removed. Microscopic examination at 30× reveals that the large majority of bran and germ is removed from the wheat in the initial bran removal step. Generally visual inspection shows that the germ is removed from more than 50% (and often about 75%) of the grains of wheat. The machines 10A, 10B have a high capacity, and throughput rates of 90-100 bushels per machine per hour for each of the machines 10A and each of the machines 10B have been achieved. Throughput rates of 120 bushels or more per machine per hour may be possible.

Output from the second bran removal machine 10B is a pearled wheat which is applied as an input feedstock to the size reduction and further bran removal step described below.

Size Reduction And Further Bran Removal Step

FIGS. 5A-5H define the presently preferred size reduction and further bran removal step in complete detail understandable to one of ordinary skill in the art. These figures represent the primary disclosure of this step, and the following comments are intended merely to clarify the symbols used in those figures.

As shown in FIGS. 5A through 5H, the size reduction and further bran removal step employs roller mills, sifters and purifiers. The pearled wheat product produced by five sets of bran removal machines 10A, 10B is supplied as an input feedstock to a first break roll shown in FIG. 5A and identified as 1 BK. As there indicated, the first break roll includes six pairs of rolls, each 10 inch in diameter and 36 inches long. These rolls are provided with deep Getchel (DGH) teeth spaced at 12 teeth per inch and arranged to face one another dull to dull (D:D). The rolls are operated at a differential rotational speed of 2.5 to 1, and the teeth are cut at a 1.25 inch spiral cut. The remaining roller mills are defined in similar terms in the figures. The symbol "GH" is used to indicate Getchel as opposed to deep Getchel teeth, and the symbol "S:S" indicates the teeth face each other sharp to sharp.

Figure 5A:
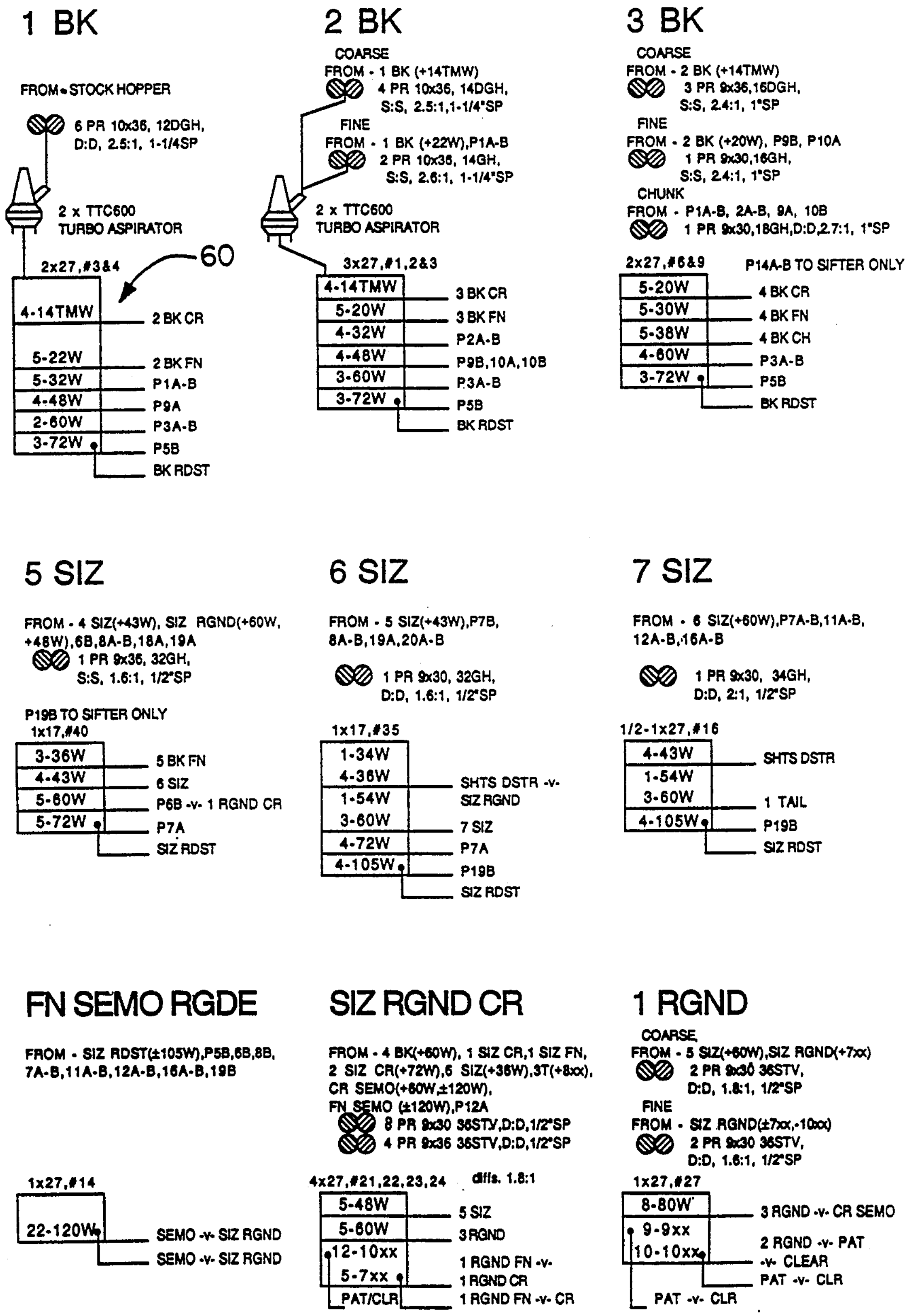
Figure 5B:
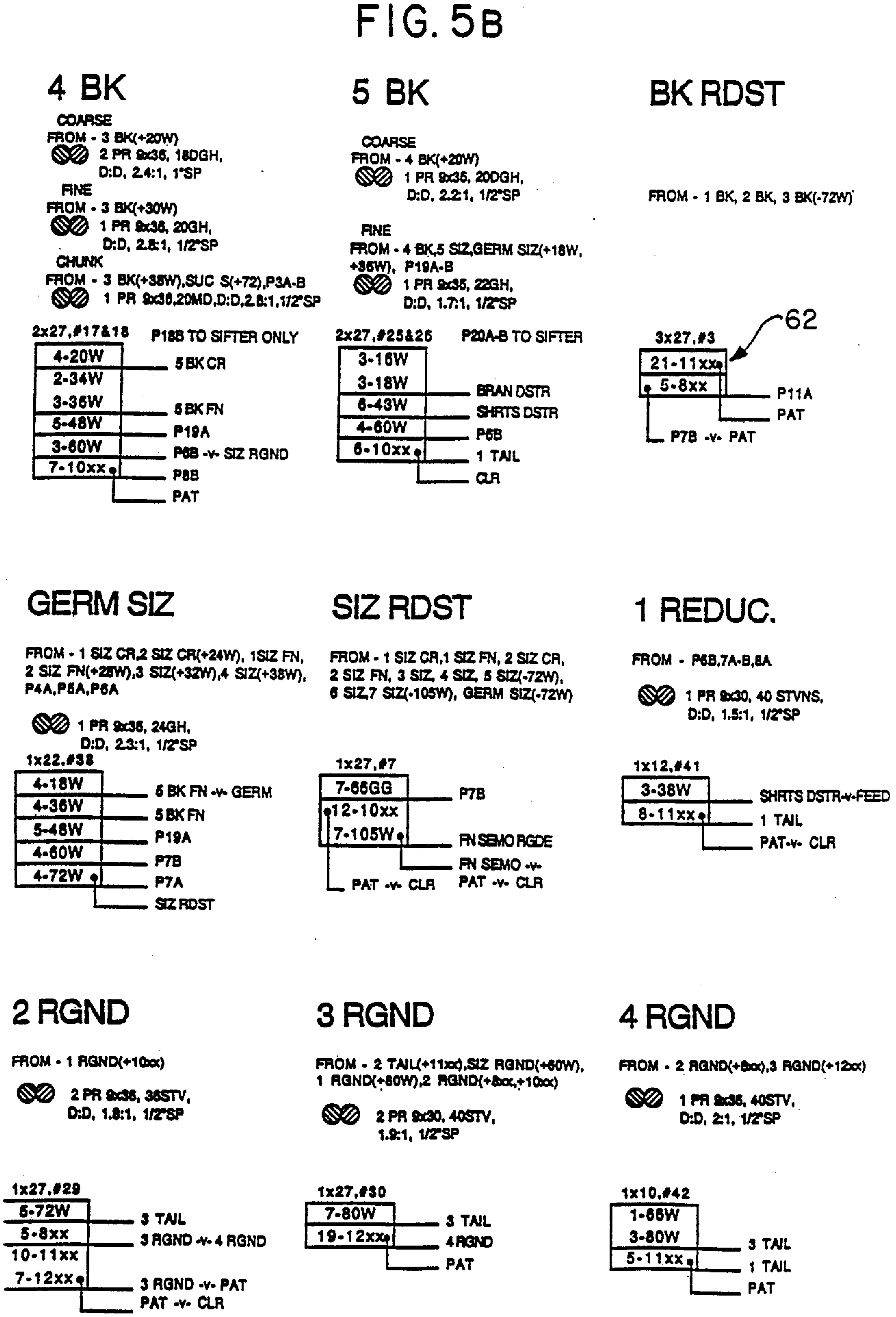

The output from the first break rolls 1 BK is applied as an input to a turbo aspirator which separates bran from endosperm. The endosperm fraction is applied to a sifter shown at reference numeral 60. This is a conventional sifter having up to 27 horizontal sieves or screens arranged one above the other. The sieves are formed of grids of cloth of the type identified in the drawings. The codes used here to define the size of the sieves are the standard codes, as defined for example in "Comparative Table of Industrial Screen Fabrics" published by H. R. Williams Mill Supply Company, Kansas City, Mo. In FIG. 5A, the screens in the sifter 60 are identified by a first number which indicates the number of layers in the sifter made up of the indicated screen, a dash, and a second number which defines the screen. For example, in sifter 60 the upper four layers are of screen type 14TMW, having screen openings of 0.062 inches. The next five layers of screen in the sifter 60 are type 22W having screen openings of 0.038 inches.

Again referring to sifter 60, symbols such as those on the right indicate where the "overs" which fail to pass through the respective screens are directed. For example, overs which fail to pass through the 14TMW screens are passed to the second break coarse rolls (2 BK CR). Symbols such as those used in sifter 60 in connection with BK RDST indicate where the throughs which pass through the sieves are directed. For example, in the sifter 60 the troughs which pass through all of the screens including the finest 72W screens are directed to BK RDST, the sifter 62 shown in FIG. 5B.

Additionally, the size reduction and further bran removal step shown in FIGS. 5A–5H includes a set of purifiers P1A–P18B. Purifiers such as those shown in these figures are generally conventional and well known to those skilled in the art. The following comments will define the symbols used in describing each of the purifiers, using purifier P1A of FIG. 5E by way of example.

Figure 5C:
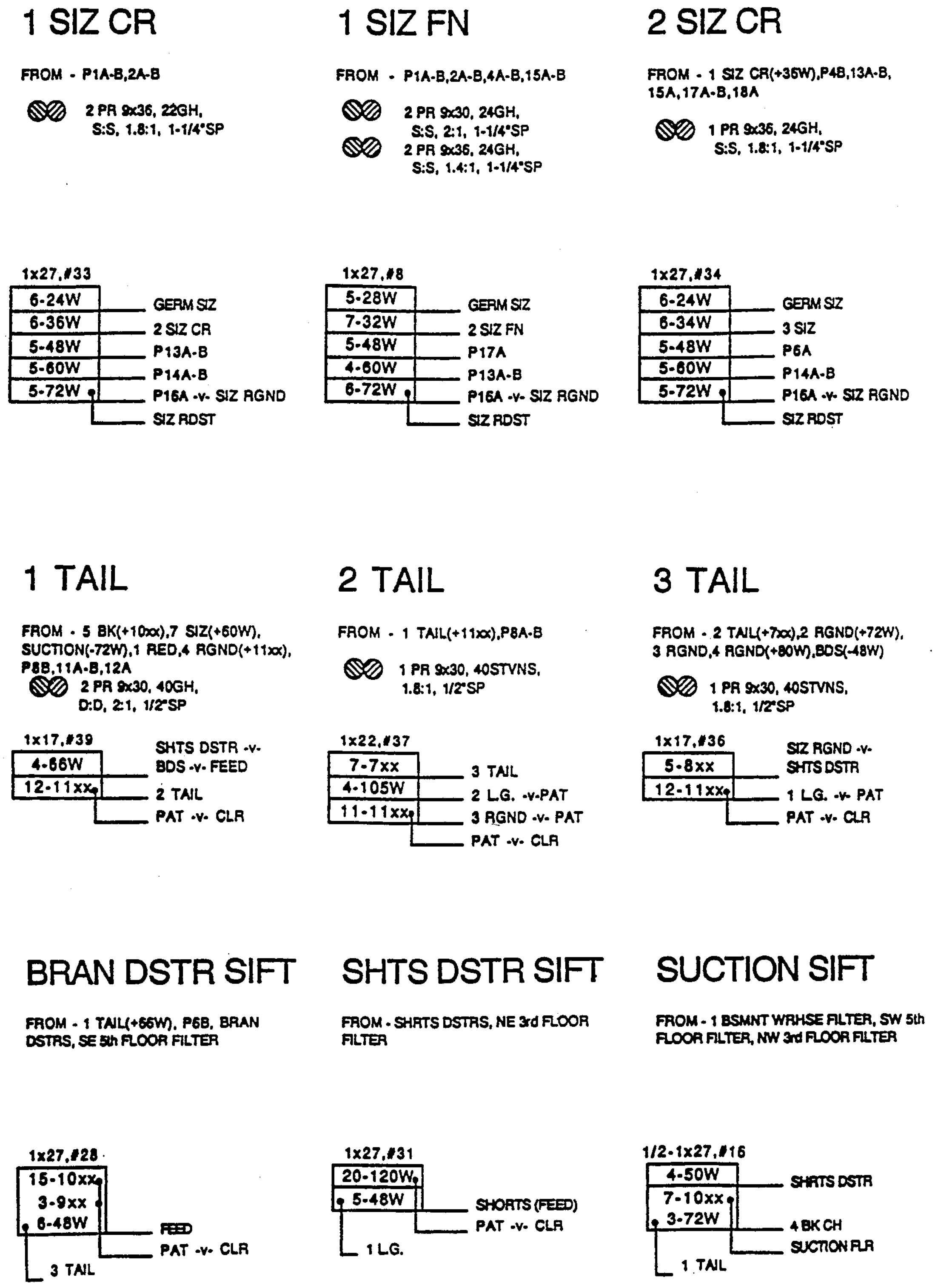
Figure 5D:
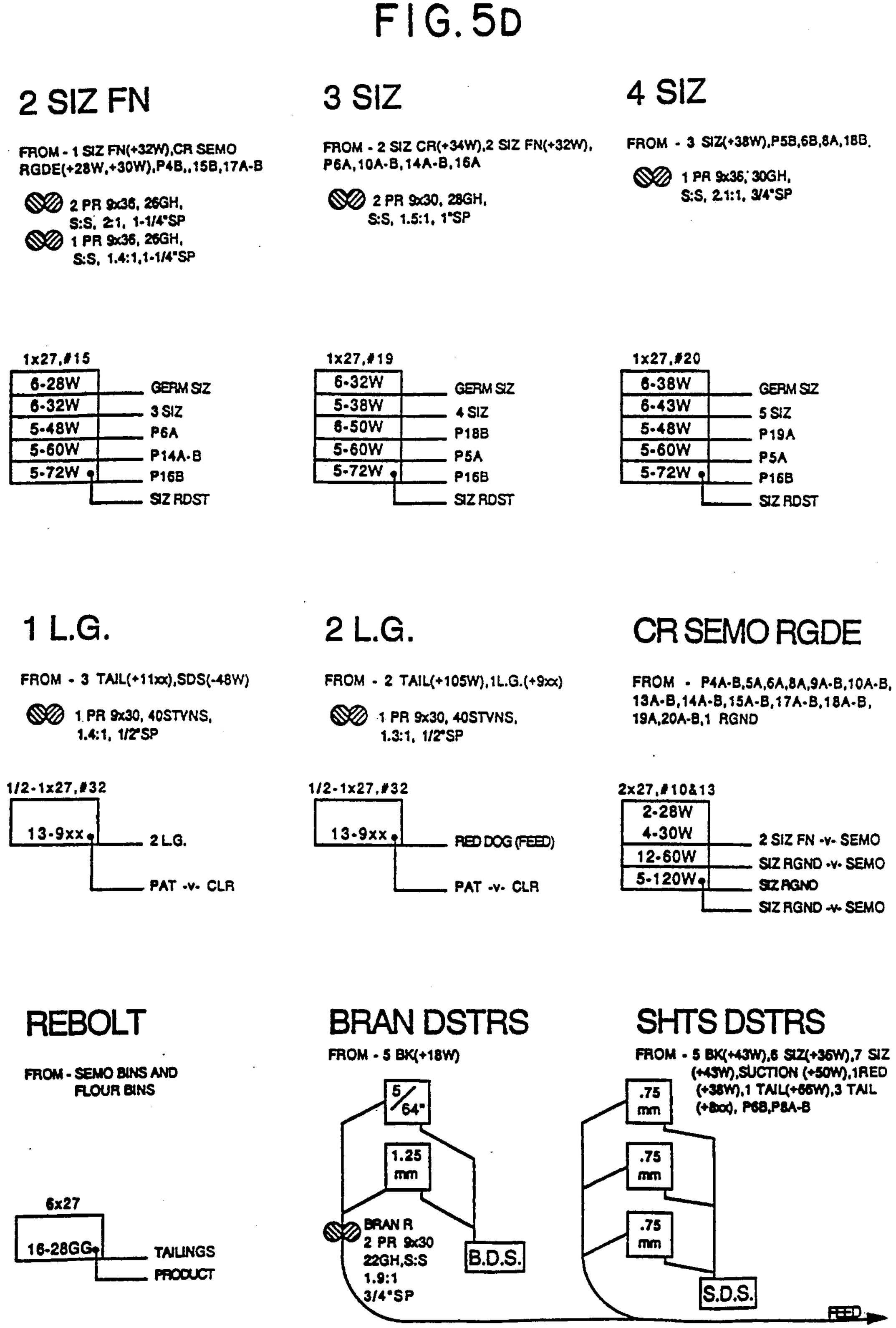
Figure 5E:
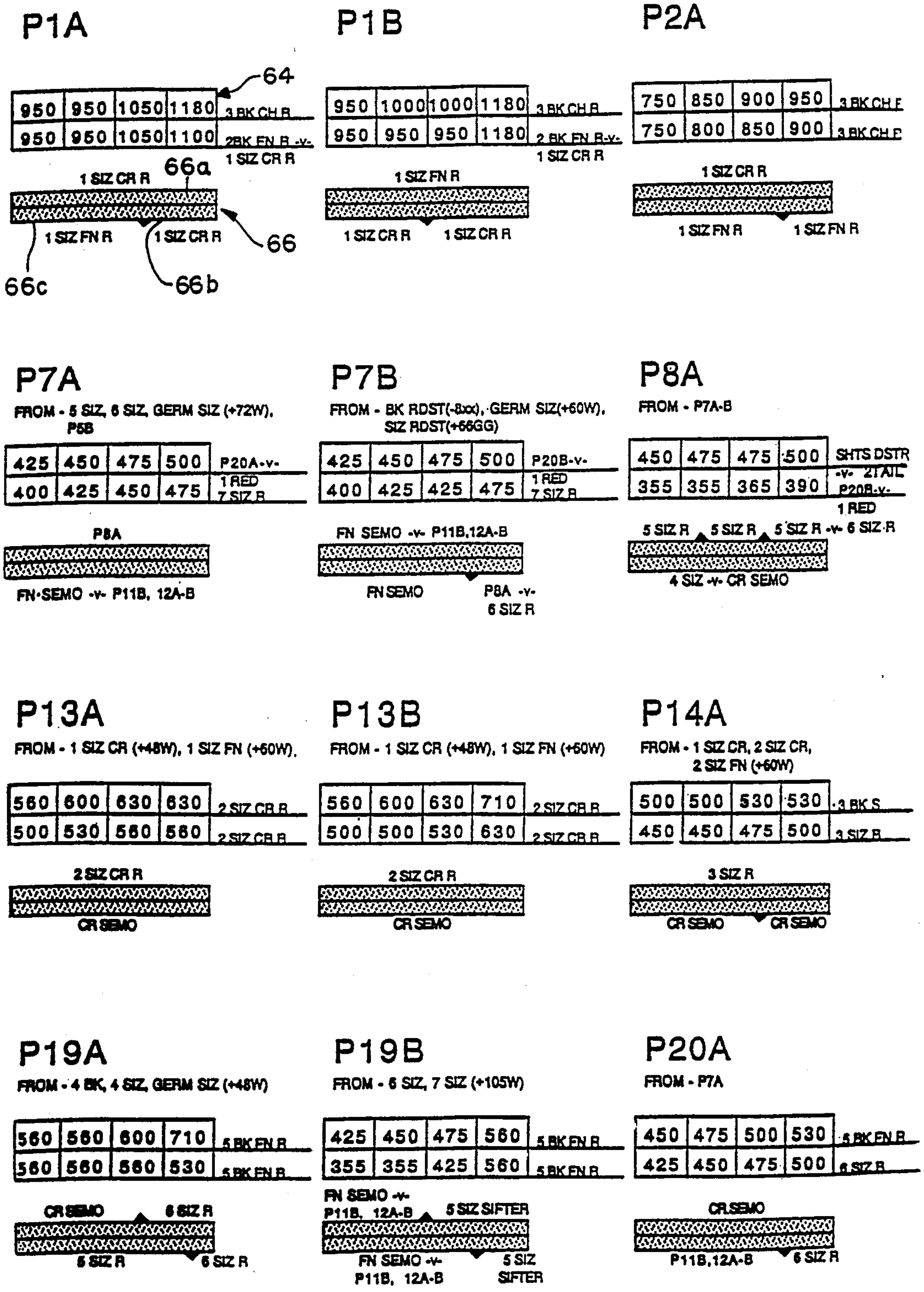
Figure 5G:
Figure 5G:
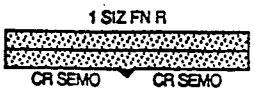
Figure 5G:
Figure 5G:
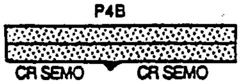
Figure 5G:
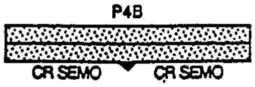
Figure 5G:
Figure 5G:
Figure 5G:
Figure 5G:
Figure 5H:
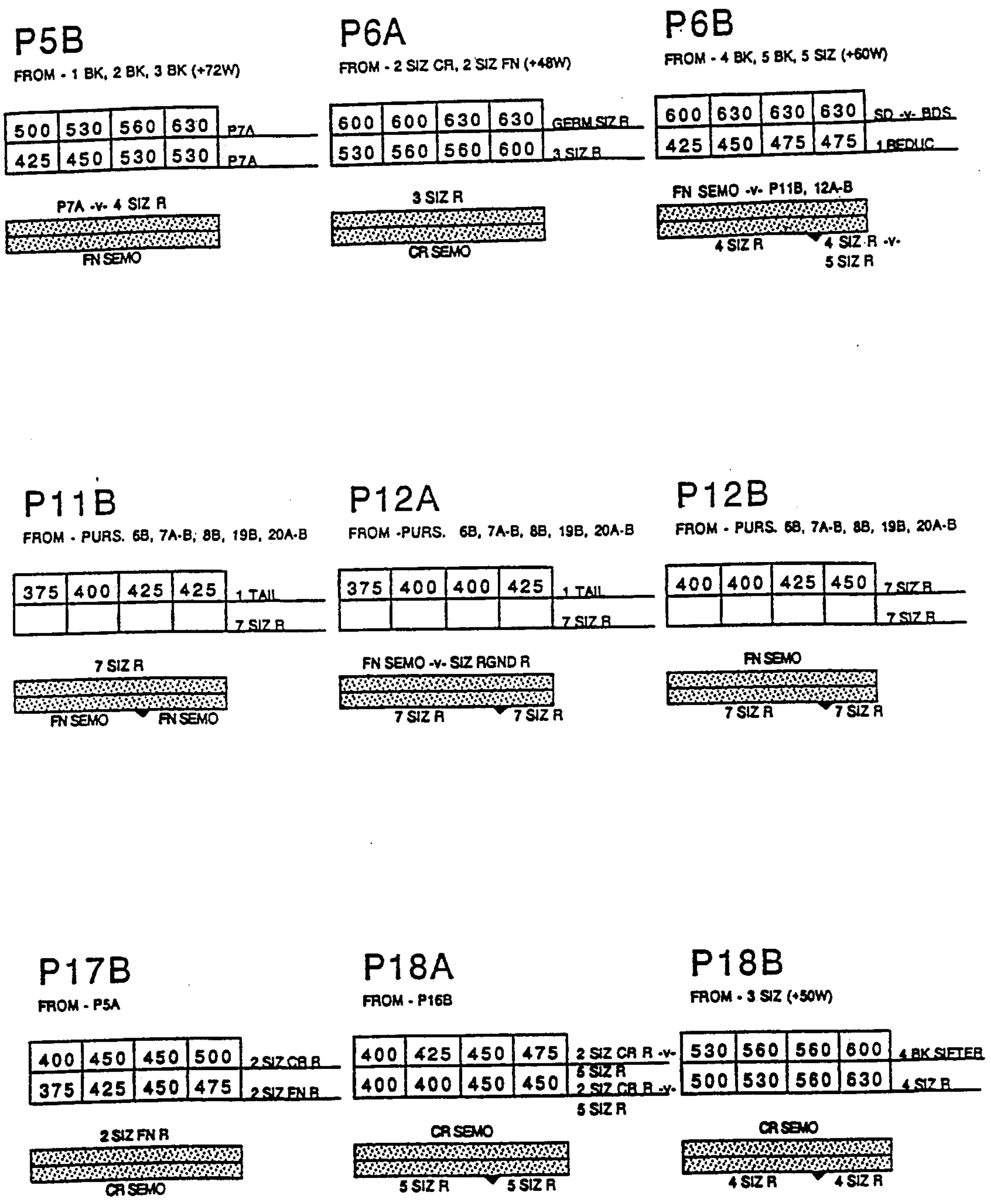

Purifier P1A receives its feedstock from the sifter 60, and in particular the overs from the 32W screens. The purifier P1A includes two decks of screens which slope downwardly from left to right and which have screen openings (measured in microns) as shown at 64. Thus, the upper set of screens on the purifier P1A has a screen opening size of 950 microns at the left and 1180 microns at the right. The milled wheat is introduced onto the right hand end of the upper screen, which is moved in a cyclical fashion. The overs which do not pass through the upper screen are directed to the third break chunk rolls (3 BK CH R) of FIG. 5A. The fraction of the incoming stream which passes through the upper deck of screens but not the lower deck of screens (the overs from the lower deck of screens) is directed to the second break fine rolls (2 BK FN R) shown in FIG. 5A, or alternately (as indicated by the valve —V—) to the first size reduction coarse rolls (1 SIZ OR R) shown in FIG. 5C. The throughs which pass through both of the screen decks are directed as shown at 66. In the diagram 66 the adjacent symbols indicate the rolls to which the corresponding fraction is directed. For example, the fraction that falls through the open areas 66A and 66B is directed to the first size reduction coarse rolls (1 SIZ CR R) as shown in FIG. 5C. Similarly, the fraction that falls through the open area 66C is directed to the first size reduction fine rolls (1 SIZ FN R) of FIG. 5C. The diagram 64 is best understood as a schematic elevation view and the diagram 66 as a schematic plan view.

From this description it should be apparent that for each of the purifiers the source of the feedstock, the screen size, and the destination of the overs and the throughs is indicated. Additionally, in the conventional manner an air flow is maintained over the screens to remove bran and germ for processing separately from endosperm.

In order to further define the best mode of this preferred embodiment, the following details are provided regarding the roller mills, turbo aspirators, sifters and purifiers described above. The roller mills can be any conventional roller mills, such as those manufactured by OCRIM as Model No. LAM-CVA or equivalent. The turbo aspirators can be of the type distributed by OCRIM as Model No. TTC/450. The sifters can be any conventional sifters such as free swinging sifters distributed by Great Western Manufacturing. If desired, the sieves of the sifters may be backed with a layer of ½ inch by ½ inch intercrimped wire mesh mounted about ¾ inch below the sieve. Five hard rubber balls ⅝ inch in diameter may be placed in each quadrant on the respective wire mesh to bounce against the overlying sieve and keep it clean.

The purifiers are preferably slightly modified versions of the Simon Mark IV purifier distributed by Robinson Manufacturing of the United Kingdom operated at 2000 cubic feet per minute of air and a screen rotational speed of 450 rpm. The modification of these purifiers relates to the addition of a tray of expanded metal mounted below each deck of screen to move with the respective deck. Each of these expanded metal trays defines diamonds dimensioned approximately 0.5 inch along the direction of product movement and 1 inch perpendicular to the direction of product movement. The tray is preferably about ¾ of an inch below the level of the deck to form a confined area between the expanded metal tray and the overlying deck of screen. This area is divided into three sections along the length of the purifier, and each section confines 27 brown rubber balls about ⅝ of an inch in diameter, such as those supplied by H. R. Williams. These confined balls bounce between the expanded metal tray and the overlying screen in order to keep the screen clear.

Preferably the separations between the rolls of the roller mills are set to provide the roll extractions set out in Table II.

TABLE II

| Roll | Weight Percentage Passing Through Selected Sieve | Selected Sieve |
|---|---|---|
| 1st Break | 45% | 18W |
| 2nd Break Cr | 54% | 18W |
| 2nd Break Fn | 58% | 28W |
| 3rd Break Cr | 48% | 18W |
| 3rd Break Ch-S | 78% | 24W |
| 3rd Break Fn-N | 50% | 24W |
| 4th Break Cr | 42% | 18W |
| 4th Break Fn | little | 28W |
| 4th Break Ch | little | 28W |
| 1 Siz Cr | 66–68% | 36W |
| 1 Siz Fn | 72–74% | 36W |
| 1 Siz Cr | 88–90% | 36W |

In Table II, the second column indicates the weight percent of the output of the indicated roller mill that passes through a sieve of the size indicated in the respective row of the third column.

EXAMPLES

Example 1

The milling process described above in connection with FIGS. 1-5H was used for approximately one month in a full scale roller mill to process milling quality hard amber durum wheat. Table III presents yield data for this example in comparison with yield data for a conventional roller mill. In Table III yields are expressed as weight percent of the designated stream as a fraction of the incoming dirty wheat. The yield data of Table III for the conventional roller mill are one-year average values for milling quality hard amber durum wheat milled at the same location, before it was converted to the process of FIGS. 1-5H.

The milling process of FIGS. 1-5H has been shown to have an increased yield and throughput with reduced capital and energy costs as compared with the conventional roller mill it replaced.

TABLE III

| | Average Ash Content (wt %) | Ex 1 Yield (wt %) | Conventional Roller Mill Yield (wt %) |
|---|---|---|---|
| Patent Stream | ≦.75 | 66.6 | 59.6 |
| Total Food Grade Stream | ≦1.0 | 76.0 | 71.8 |
| Ratio Patent Stream/ Total Food Grade Stream | | .88 | .83 |

Table III shows that the average yields for the patent stream and the total food grade stream were significantly higher for Example 1 than for the conventional mill. This yield improvement was obtained without any offsetting decrease in the quality of the milled wheat product. As discussed below in Example 2, chemical analysis and food tests have shown that wheat products milled in accordance with this invention are equal or better to conventionally milled wheat products.

Example 2

A quantity of hard amber durum wheat was divided into two batches. Batch A was milled as described above in connection with FIGS. 1-5H and Batch B was milled in a conventional roller mill. Aleurone cell wall fragments in flour, expressed as percent of measured area, and ash content were measured for Batches A and B, and the results are shown in Table IV.

TABLE IV

| | Ash Content (wt %) | Measured Aleurone Fluorescence Area (Mean Area %) | Number of Samples in Mean | Std. Dev. | Std. Error | % Increase |
|---|---|---|---|---|---|---|
| Batch A | | | | | | |
| Patent Flour | 0.84 | 3.89 | 10 | 1.02 | 0.32 | 40% |
| Straight Flour | 0.99 | 4.21 | 10 | 0.70 | 0.22 | 29% |
| Batch B | | | | | | |
| Patent Flour | 0.92 | 2.77 | 10 | 0.60 | 0.19 | |
| Straight Flour | 1.03 | 3.27 | 10 | 0.59 | 0.19 | |

In Table IV, straight flour is a combination of patent and clear flour and corresponds to the total food grade flour of the mill. The following measurement protocol was used to obtain the measured aleurone fluorescence areas of Table IV.

1. Ten replicates of approximately 1 G of flour were drawn from each of the four flour samples and prepared for fluorescence analysis using reflectance optics:

a. Each flour sub-sample was placed on a clean glass microscope slide, compressed to uniform thickness of at least 3 mm, and mounted on the scanning stage of a UMSP80 microspectrophotometer (Carl Zeiss Ltd, New York).

b. Each sub-sample was illuminated at 365 nm using a 100 W mercury illuminator (Osram HBO 100) and fluorescence filter set as described by DW Irving, RG Fulcher, MM Bean and RM Saunders "Differentiation of wheat based on fluorescence, hardness, and protein", *Cereal Chemistry,* 66(6): 471-477 (1989). In these conditions, aleurone cell walls are highly fluorescent at approximately 450 nm, while the non-aleurone flour fragments are relatively non-fluorescent.

c. The UMSP80 was used to illuminate the specimens using top surface or epi-illumination of each sample. This required use of a specific epi-illuminating filter set comprised of an excitation filter (365 nm max trans, see above), a dichroic mirror (trans max=395 nm) which reflects excitation illumination from the HBO 100 illuminator to the surface of the specimen, and a barrier filter which transmits all fluorescent light above 420 nm to the detector.

d. The UMSP80 was equipped with a 10× Neofluar objective (Carl Zeiss Ltd), and fluorescent light was transmitted to a photomultiplier through a 0.63 mm pin-hole mounted above the specimen. The instrument was also equipped with a computer-controlled scanning stage which allowed the operator to move the specimen step-wise under the illumination and measuring pin-hole such that fluorescence measurements were obtained over a predefined matrix over the surface of each specimen. For this analysis the scanning stage was programmed (using the proprietary software "MAPS" from Carl Zeiss Ltd) to obtain fluorescence intensity values at 40 micrometer×60 micrometer intervals over a 28.5 square mm area. This resulted in approximately 12,000 data points, or pixels, per sub-sample of flour. The data shown above therefore represents approximately 120,000 pixels per mean value.

e. In order to standardize the measurement procedure, a stable, fluorescent, uranyl glass filter (GG17, Carl Zeiss Ltd) was placed at a fixed distance from the front surface of the Neofluar objective. The photomultiplier was then calibrated to the standard as 100% fluorescence intensity, and fluorescence of each pixel of the flour samples was measured and recorded relative to the GG17 standard.

f. The measurement procedure generated a digitized image of the fluorescence intensities over the area scanned. Aleurone cell wall fragments typically had very high values (greater than 70–80% relative fluorescence intensity), while non-aleurone material had very little fluorescence (typically 10–60% relative fluorescence intensity). Consequently, all images were inspected and a threshold value (80% relative fluorescence intensity) was applied to allow computer-aided identification and quantitation of aleurone fragments as a percentage of the entire scanned matrix. This value, the "measured aleurone fluorescence area" was taken as a quantitative measure of aleurone cell wall fragments in the sub-sample. The means, standard deviations, and standard errors of all sub-samples for a given flour type ar given in Table IV.

Table IV shows that wheat milled in accordance with the presently preferred embodiment of this invention (Batch A) has a higher content of aleurone cell wall fragments for a given ash content. In general Batch A has a measured aleurone fluorescence area which is about 30–40% greater than that of Batch B within a grade. Increased retention of the aleurone layer is believed to be a factor in the yield improvements discussed in Example 1 above.

Batches A and B were chemically analyzed in the conventional manner for moisture content, ash content, protein, brightness and yellowness. Additionally, comparative food tests were performed to assess color, absorption of water, cooking losses, firmness and rheologic characteristics. These tests confirmed that in general the flour of Batch A was equal to or better than the flour of Batch B, and that each could be substituted for the other within a grade without any significant difference. Though Example 2 utilized flour, similar results are expected for semolina.

Of course, it should be understood that a wide range of changes and modifications can be made to the preferred embodiments described above. Wheat cleaning steps can be varied as appropriate, and the bran removal machines may be altered as long as adequate bran removal and throughput are obtained. The roller mill may also be modified as appropriate for other applications, such as soft or hard wheat milling. The process of this invention is not limited to use with durum wheat, but may also be used with other wheats such as hard and soft wheat. It is therefore intended that the foregoing description be regarded as illustrative rather than limiting, and that it be understood that it is the following claims, including all equivalents, which are intended to define the scope of this invention.

I claim:

1. A process of milling wheat comprising the following steps:

a) providing a quantity of milling quality wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving to two sets of abrasive elements with respect to one another, thereby forming a reduced bran pearled wheat;

c) tempering the wheat for at least about one hour prior to completion of step (b); then d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is operative to retain a substantial portion of the aleurone layer with the endosperm after step (b).

2. The process of claim 1 wherein a sufficient portion of the outer bran layers is removed in step (b) to cause the finely divided final product to constitute at least 65 wt % of the quantity of wheat and to have an ash content no greater than about 0.75 wt %.

3. The process of claim 1 wherein a sufficient portion of the outer bran layers is removed in step (b) to cause the finely divided final product to constitute at least 75% of the quantity of wheat and to have an ash content no greater than about 1.0 wt %.

4. The process of claim 1 wherein the finely divided final product comprises a flour.

5. The process of claim 1 wherein the finely divided final product comprises a semolina.

6. The process of claim 1 or 2 or 3 wherein the milling quality wheat comprises a milling quality durum wheat.

7. The process of claim 6 wherein at least about 8% of the weight of the wheat is removed in step (b), before step (d).

8. The process of claim 1 or 2 or 3 wherein more than one half of the germ is removed from the wheat in step (b), before step (d).

9. The process of claim 1 or 2 or 3 wherein step (b) is performed at a rate greater than about 70 bushels per hour of wheat per pair of sets of abrasive elements.

10. The process of claim 1 wherein step (b) is performed at a rate greater than about 100 bushels per hour of wheat per pair of sets of abrasive elements.

11. The process of claim 1 or 2 or 3 wherein step (b) comprises the step of passing the wheat vertically upwardly between the two sets of abrasive elements.

12. The process of claim 1 further comprising the step of providing the abrasive elements each with a respective toothed surface positioned to contact the wheat.

13. The process of claim 12 wherein each toothed surface comprises a plurality of teeth, and wherein each tooth defines a sharp face and a dull face, said sharp face oriented more nearly perpendicular to the opposing abrasive element.

14. The process of claim 13 further comprising the step of arranging the abrasive elements such that a sharp face on one abrasive element approaches a dull face of another abrasive element as the abrasive elements are moved with respect to one another in step (b).

15. The process of claim 6 wherein the final product has a measured aleurone fluorescence area no less than about 3.9% and an ash content no greater than about 0.85 wt %.

16. The process of claim 6 wherein the final product has a measured aleurone fluorescence area greater than about 4.0% and an ash content no greater than about 1.0 wt %.

17. The process of claim 1 wherein step (b) comprises the steps of (b1) passing the wheat between two first sets of abrasive elements while flowing a gas through the wheat and moving the two first sets of abrasive elements with respect to another; and then (b2) passing the wheat between two second sets of abrasive elements while flowing a gas through the wheat and moving the two second sets of abrasive elements with respect to one another.

18. The process of claim 17 wherein step (c) comprises the step of tempering the wheat between steps (b1) and (b2).

19. The process of claim 1 or 2 or 3 wherein step (c) is completed before step (b) is begun.

20. The process of claim 17 wherein step (d) follows directly after step (b2) such that step (b) consists essentially of steps (b1) and (b2).

21. The process of claim 1 wherein step (b) comprises the step of passing the wheat consecutively through no more than two stages of bran removal, each stage comprising at least one respective pair of the sets of abrasive elements.

22. The process of claim 21 wherein step (b) comprises the step of passing the wheat vertically upwardly between the sets of abrasive elements in each stage of bran removal.

23. The process of claim 22 wherein each stage of bran removal is performed at a rate greater than about 70 bushels of wheat per hour per pair of sets of abrasive elements.

24. A process for milling wheat comprising the following steps:

a) providing a quantity of milling quality durum wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat between at least two sets of abrasive elements while flowing air through the wheat and moving the two sets of abrasive elements with respect to one another, thereby forming a reduced bran pearled wheat; then c) tempering the wheat for at least about one hour prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm such that the final product has a measured aleurone fluorescence area no less than about 3.9% and an ash content no greater than about 0.85 wt %.

25. The process of claim 24 wherein the final product has a measured aleurone fluorescence area greater than about 4.0% and an ash content no greater than about 1.0 wt %.

26. The process of claim 24 wherein a sufficient portion of the outer bran layers is removed in step (b) to cause the finely divided final product to constitute at least 65 wt % of the quantity of wheat and to have an ash content no greater than about 0.75 wt %.

27. The process of claim 24 wherein a sufficient portion of the outer bran layers is removed in step (b) to cause the finely divided final product to constitute at least 75% of the quantity of wheat and to have an ash content no greater than about 1.0 wt %.

28. A process for milling wheat comprising the following steps:

a) providing a quantity of milling quality wheat having an endosperm and germ surrounded by a plurality of bran layers, said endosperm comprising an aleurone layer;

b) removing portions of the germ and the outer bran layers weighing at least about 5% of the initial weight of the wheat without substantially reducing the average size of the endosperm by passing the wheat vertically between at least two sets of abrasive elements while flowing air through the wheat and moving the two sets of abrasive elements with respect to one another, thereby forming a reduced bran pearled wheat; then c) tempering the wheat for at least about one hour prior to completion of step (b);

d) progressively reducing the average size of the pearled wheat by passing the pearled wheat through a sequence of multiple roller mills to form a finely divided final product at a plurality of roller mills in the sequence; and e) removing additional portions of the remaining bran layers during step (d);

wherein step (b) is configured to retain a substantial portion of the aleurone layer with the endosperm after step (b).

29. The process of claim 28 wherein step (b) comprises the steps of:

(b1) passing the wheat between two first sets of abrasive elements while flowing a gas through the wheat and moving the two first sets of abrasive elements with respect to another; and then (b2) passing the wheat between two second sets of abrasive elements while flowing a gas through the wheat and moving the two second sets of abrasive elements with respect to one another.

30. The process of claim 29 wherein steps (b1) and (b2) define two consecutive bran removal stages, and wherein these two bran removal stages are the only consecutive bran removal stages of step (b).

31. The process of claim 28 wherein the quantity of milling quality wheat comprises a durum wheat, and wherein a sufficient portion of the outer bran layers is removed in step (b) to cause the finely divided final product to constitute at least 65 wt % of the quantity of wheat and to have an ash content no greater than about 0.75 wt %.

32. The process of claim 28 wherein the quantity of milling quality wheat comprises a durum wheat, and wherein a sufficient portion of the outer bran layers is removed in step (b) to cause the finely divided final product to constitute at least 75% of the quantity of wheat and to have an ash content no greater than about 1.0 wt %.

33. The process of claim 28 wherein step (b) is performed at a rate greater than about 100 bushels of wheat per hour per pair of sets of abrasive elements.

34. The process of claim 28 wherein step (b) is performed at a rate greater than about 70 bushels of wheat per hour per pair of sets of abrasive elements.

* * * * *